United States Patent
Bizoara et al.

(10) Patent No.: US 10,867,141 B2
(45) Date of Patent: Dec. 15, 2020

(54) SYSTEM AND METHOD FOR AUGMENTED REALITY CONFIGURATION OF INDICIA READERS

(71) Applicant: Hand Held Products, Inc., Fort Mill, SC (US)

(72) Inventors: Manjul Bizoara, Hyderabad (IN); Venkata Sudhakar Bulusu, Karnataka (IN)

(73) Assignee: HAND HELD PRODUCTS, INC., Fort Mill, SC (US)

(*) Notice: Subject to any disclaimer, the term of this patent is extended or adjusted under 35 U.S.C. 154(b) by 0 days.

(21) Appl. No.: 16/029,937

(22) Filed: Jul. 9, 2018

(65) Prior Publication Data
US 2019/0018992 A1  Jan. 17, 2019

(30) Foreign Application Priority Data
Jul. 12, 2017 (IN) .............................. 201711024604

(51) Int. Cl.
*G06K 19/00* (2006.01)
*G06K 7/10* (2006.01)
(Continued)

(52) U.S. Cl.
CPC ..... *G06K 7/10722* (2013.01); *G06K 7/10544* (2013.01); *G06K 7/10881* (2013.01);
(Continued)

(58) Field of Classification Search
USPC ................................. 235/435, 439, 454, 462
See application file for complete search history.

(56) References Cited

U.S. PATENT DOCUMENTS 6,832,725 B2  12/2004  Gardiner et al.
7,128,266 B2  10/2006  Zhu et al.
(Continued)

FOREIGN PATENT DOCUMENTS

EP  2423848 A2  2/2012
WO  2013/173985 A1  11/2013
(Continued)

OTHER PUBLICATIONS codereadr.com, "Preview Multiple Barcodes Simultaneously," dated Nov. 28, 2016; Downloaded from www.codereadr.com/knowledgebase/preview-multiple-barcodes-simultaneously/, pp. 1-3.
(Continued)

*Primary Examiner* — Matthew Mikels
(74) *Attorney, Agent, or Firm* — Alston & Bird LLP

(57) ABSTRACT

The system and process described herein will utilize an application configured in an image capturing system such as a handheld terminal to detect and mark a plurality of barcodes in the field of view of the terminal and show the details to the operator. The application will guide the operator through text and/or voice to configure the terminal to read the intended barcode labels. For reading multiple barcodes on an object, the application will provide various barcode sequencing configurations support. The application may suggest sequencing criteria based on past configuration options.

18 Claims, 6 Drawing Sheets
(3 of 6 Drawing Sheet(s) Filed in Color)

(51) Int. Cl.
*G06K 7/14* (2006.01)
*G06F 3/16* (2006.01)
*G06T 11/60* (2006.01)

(52) U.S. Cl.
CPC ............ *G06K 7/1413* (2013.01); *G06F 3/167* (2013.01); *G06T 11/60* (2013.01)

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |

(56) References Cited

U.S. PATENT DOCUMENTS

| | | |
|---|---|---|
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,660 B2 | 2/2016 | Lu et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,282,501 B2 | 3/2016 | Wang et al. |
| 9,286,496 B2 | 3/2016 | Smith |
| 9,292,969 B2 | 3/2016 | Laffargue et al. |
| 9,297,900 B2 | 3/2016 | Jiang |
| 9,298,667 B2 | 3/2016 | Caballero |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,342,827 B2 | 5/2016 | Smith |
| 9,355,294 B2 | 5/2016 | Smith et al. |
| 9,361,882 B2 | 6/2016 | Ressler et al. |
| 9,365,381 B2 | 6/2016 | Colonel et al. |
| 9,367,722 B2 | 6/2016 | Xian et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |

(56) References Cited

U.S. PATENT DOCUMENTS

| | | |
|---|---|---|
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,405,011 B2 | 8/2016 | Showering |
| 9,407,840 B2 | 8/2016 | Wang |
| 9,411,386 B2 | 8/2016 | Sauerwein |
| 9,412,242 B2 | 8/2016 | Van Horn et al. |
| 9,418,252 B2 | 8/2016 | Nahill et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,448,610 B2 | 9/2016 | Davis et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,582,696 B2 | 2/2017 | Barber et al. |
| 9,606,581 B1 | 3/2017 | Howe et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2011/0215146 A1* | 9/2011 | Shams .................. G06F 17/00 235/383 |
| 2012/0048939 A1 | 3/2012 | Fiutak et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166761 A1 | 6/2014 | Todeschini et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191913 A1 | 7/2014 | Ge et al. |
| 2014/0197239 A1 | 7/2014 | Havens et al. |

(56) References Cited

U.S. PATENT DOCUMENTS

| | | |
|---|---|---|
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0069130 A1 | 3/2015 | Gannon |
| 2015/0083800 A1 | 3/2015 | Li et al. |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |

(56) References Cited

U.S. PATENT DOCUMENTS

| | | |
|---|---|---|
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| WO | 2013163789 A1 | 11/2013 |
| WO | 2014/019130 A1 | 2/2014 |
| WO | 2014/110495 A1 | 7/2014 |

OTHER PUBLICATIONS

Extended Search Report in related European Application No. 18183019.1 dated Nov. 14, 2018, pp. 1-7.

Decision to grant a European patent dated Jun. 12, 2020 for EP Application No. 18183019.

U.S. Patent Application for Indicia Reader filed Apr. 1, 2015 (Huck), U.S. Appl. No. 14/676,109.

U.S. Patent Application for Multifunction Point of Sale Apparatus With Optical Signature Capture filed Jul. 30, 2014 (Good et al.), U.S. Appl. No. 14/446,391.

U.S. Patent Application for Multipurpose Optical Reader, filed May 14, 2014 (Jovanovski et al.); 59 pages; now abandoned., U.S. Appl. No. 14/277,337.

U.S. Patent Application for Terminal Having Illumination and Focus Control filed May 21, 2014 (Liu et al.), U.S. Appl. No. 14/283,282.

Intention to Grant for European Application No. 18183019.1, dated Jan. 28, 2020, 5 pages.

* cited by examiner

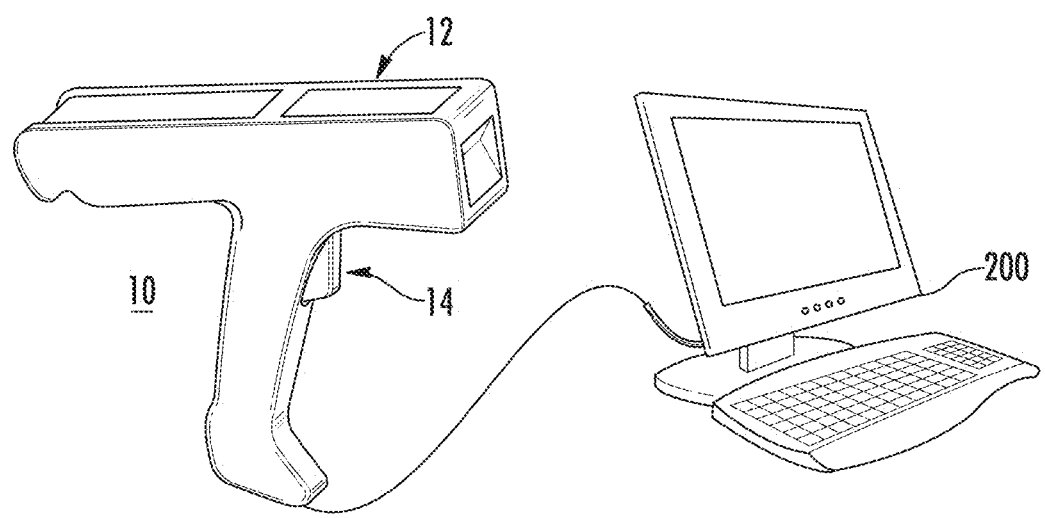
FIG. 2A
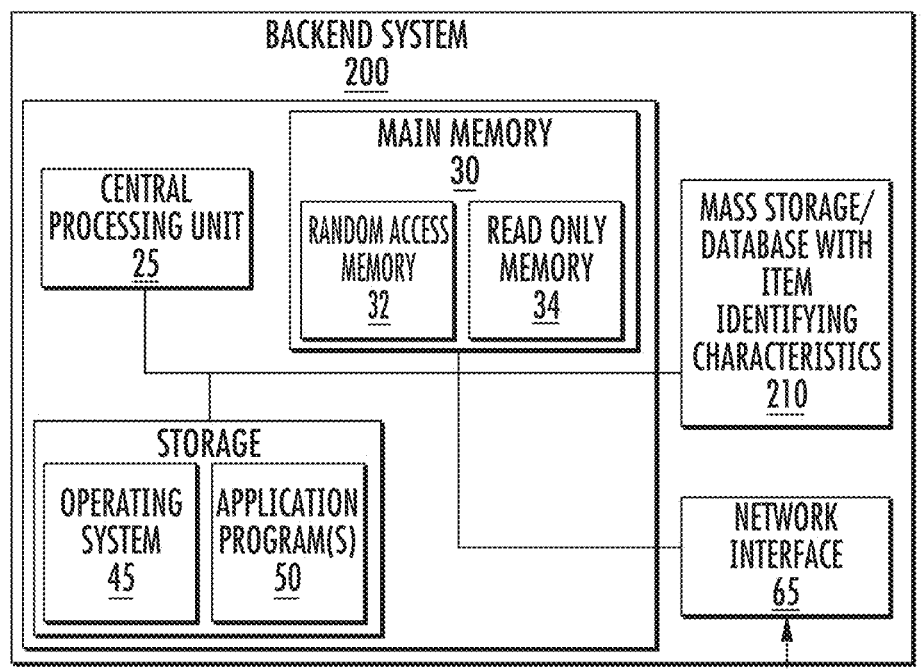
FIG. 2B

SYSTEM AND METHOD FOR AUGMENTED REALITY CONFIGURATION OF INDICIA READERS

CROSS-REFERENCE TO RELATED APPLICATION

The present application claims the benefit of Indian Patent Application No. 201711024604 for a System and Method for Augmented Reality Configuration of Indicia Readers filed Jul. 12, 2017, which is hereby incorporated by reference in its entirety.

FIELD OF THE INVENTION

The present invention relates to optical imaging devices and more particularly to a method of operating an optical imaging device.

BACKGROUND

Generally speaking optical imaging devices receive light from a target with an image sensor that outputs image data which is interpreted by a processor to perform signal and/or imaging processing. Oftentimes an optical indicia reader may be portable and wireless in nature thereby providing extra flexibility. In these circumstances, such indicia readers form part of a wireless network in which data collected by the readers is communicated to a host computer situated on a hardwired backbone via a wireless link. For example, the indicia readers may include a radio or transceiver for communicating with a remote computer. Efforts regarding such systems have led to continuing developments to improve their versatility, practicality, and efficiency.

SUMMARY

Accordingly, in one aspect, the present disclosure embraces a method of operating an image capturing system comprising: capture a plurality of indicia on a display of the image capturing system; detect and mark the indicia on the display; provide augmented details of each of the plurality of indicia on the display; determine if at least one of the plurality of indicia are using different symbology than the other indicia and, if so, provide a guide to enable configuration of the image capturing system for reading all the plurality of indicia; present on the display a predetermined sequencing criteria; and analyze the plurality of indicia.

In another aspect, the present disclosure embraces a method of operating an image capturing system comprising: capture a plurality of indicia on a display of the image capturing system; determine if at least one of the plurality of indicia are using different symbology than the other indicia and, if so, provide a guide to enable configuration of the image capturing system for reading all the plurality of indicia; present on the display a predetermined sequencing criteria; and analyze the plurality of indicia.

In another aspect, the present disclosure embraces an image capturing system comprising: a processor coupled to a reader for capturing indicia within the reader's field of view and a display for showing the indicia on a visual display; the processor configured to: capture a plurality of indicia on the display of the device; detect and mark the indicia on the display; provide augmented details of each of the plurality of indicia on the display; determine if at least one of the plurality of indicia are using different symbology and if so provide a guide to enable configuration of the image capturing system for reading all the plurality of indicia; present on the scanner display a predetermined sequencing criteria; and analyze the plurality of indicia at one time.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The patent or application file contains at least one drawing executed in color. Copies of this patent or patent application with color drawings will be provided by the Office upon request and payment of the necessary fee.

FIG. 2A is a diagram of the image capturing system 10 connected to a backend system 200 typically located at a point in a supply chain which collects information from the image capturing system 10.

FIG. 2B is a block diagram of the backend system 200.

DETAILED DESCRIPTION

Figure 1A:
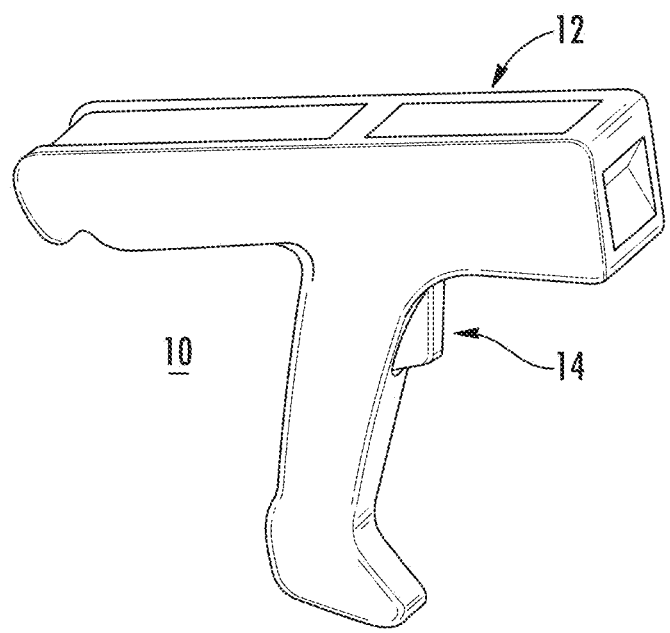
FIG. 1A is a perspective view of an image capturing system 10 such as a handheld terminal for scanning an object such as a package.

In an exemplary embodiment shown in FIG. 1A an image capturing system 10 may be a handheld terminal such as a scanner or reader which is located at a point in the supply chain. The handheld terminal will be an image capturing system for obtaining images of an object such as a package and indicia thereon whether printed or labeled within the image capturing system's field of view (e.g., an imager). The system 10 may broadly have a user interface system 12 and/or a trigger 14 to engage the image capture of the object by the system 10. User interface system 12 may be made up of a display device (reference item 70 in FIG. 1B) and an input/output (I/O) device (reference item 75 in FIG. 1B).

Figure 1B:
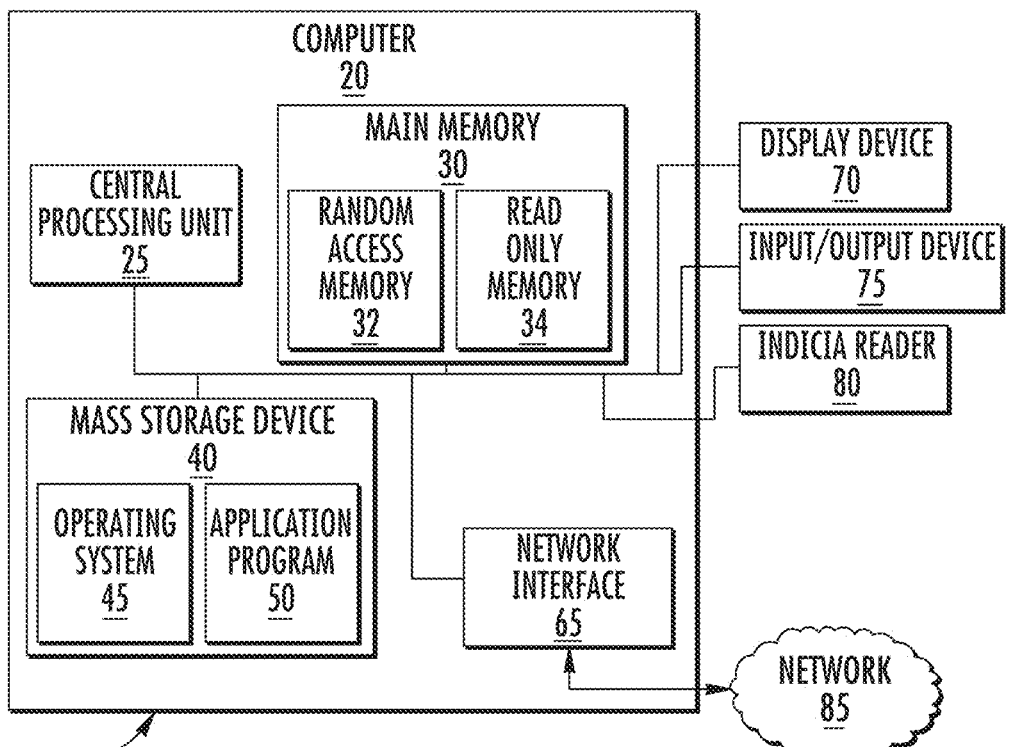
FIG. 1B is a schematic block diagram illustrating components of the image capturing system 10.

FIG. 1B is a schematic block diagram illustrating components of the image capturing system 10 according to embodiments of the present disclosure. The image capturing system 10 may include other components not shown in FIG. 1 which are not further discussed herein for the sake of brevity. One having ordinary skill in the art will understand the additional hardware and software included but not shown in FIGS. 1A and 1B. In general, the image capturing system 10 of FIGS. 1A and 1B may be implemented in any form of handheld scanner, digital computer, and mobile device having a camera. Digital computers may include, but are not limited to, laptops, desktops, workstations, fixed vehicle computers, vehicle mount computers, hazardous environment computers, rugged mobile computers, servers, blade servers, mainframes, or other appropriate computers. Mobile devices may include, but are not limited to, cellular telephones, smart phones, personal digital assistants, wireless tablets, pagers, two-way radios, netbooks, barcode scanners, radio frequency identification (RFID) readers, intelligent sensors, tracking devices, and other similar computing devices.

In particular, FIG. 1B depicts a system 10 that includes a computer 20 comprising a mass storage device 40 for storing an operating system 45 and various application programs 50. The mass storage device 40 may store other kinds of information as well. The operating system 45 includes software that controls the overall operation of the computer 20, including process scheduling and management, process protection, and memory management. Examples of suitable operating systems include, but are not limited to, WINDOWS® 7 and WINDOWS® 10 for mobile devices from MICROSOFT® CORPORATION, Apple® IoS, Android® and the LINUX® open source operating system. Typically, the operating system 45 is loaded by booting the computer 20 and is executed directly by the central processing unit 25.

Application programs 50 include any number of executable software programs designed to assist the typical user of the system 10 in the performance of specific tasks. Application programs 50 may load automatically upon execution of the operating system 45 or in response to an input from the operator through I/O device 75. These application programs 50 include the application which is the subject of this disclosure which may be referred to as an "augmented reality configuration application".

Main memory 30 provides for the storage of instructions and information directly accessible by central processing unit 25. Main memory 30 may be configured to include random-access memory 32 (RAM) and read-only memory 34 (ROM). The ROM 34 may permanently store firmware or a basic input/output system (BIOS), which provides first instructions to the computer 20 when it is booted. RAM 32 may serve as temporary and immediately accessible storage for the operating system 45 and the application programs 50.

Mass storage device 40 may be any of the various kinds of computer components capable of storing large amounts of data in a persisting (i.e., non-volatile) and machine-readable manner. Mass storage device 40 may be a hard disk, a solid state drive, optical drive, removable flash drive, self-encrypting drive or any other component with similar storage capabilities.

Display device 70 may be operably connected to the computer 20. Display device 70 may display information to the operator in the form of text or graphical output generated by computer 20. Typically, the display device 70 is a liquid crystal display (LCD) screen.

I/O device 75 is operably connected to the computer 20. The I/O device 75 facilitates the input of instructions or information by the operator. The I/O device 75 may be a keyboard and/or a mouse or some other input devices such as a touch screen or a trigger (e.g., reference item 14 in FIG. 1A). The I/O device 75 is also capable of receiving and processing voice command instructions and responding with voice instructions.

Indicia reader 80 is an image capturer which is also operably connected to the computer 20. The indicia reader 80 may be, for example, a laser scanner, image code reader, barcode reader, Radio Frequency Identification (RFID) reader, etc. The indicia reader 80 is capable of capturing indicia such as barcodes on the outside of an object (e.g., a package or a plurality of packages) which may include, but are not limited to, a plurality of indicia. The indicia reader 80 facilitates the receipt of input and provides for quick, reliable data entry that is not susceptible to typographical errors. The term indicia as used herein is intended to refer broadly to various kinds of machine-readable indicia, including barcodes, Quick Response (QR) codes, matrix codes, 1D codes, 2D codes, RFID tags, characters, Near-Field Communication (NFC) tags, Bluetooth identification, etc. The indicia are typically graphical representations of information (e.g., data) such as product numbers or object tracking numbers.

The computer 20 also includes a network interface 65. The network interface 65 is logically connected to communications network 85, thereby enabling the computer 20 to communicate with the network 85. The network 85 may be any collection of computers or communication devices interconnected by communication channels. The communication channels may be wired or wireless. Examples of such networks 85 include, without limitation, local area networks, the Internet, and/or cellular networks. The connection to the network 85 allows the computer 20 to communicate with other network nodes.

FIG. 2A is a system view which shows the image capturing system 10 connected to a personal computer, server, or backend system 200. This connection may be wired (as shown in FIG. 2A) or wireless. FIG. 2B is a block diagram of the backend system 200. The backend system 200 receives indicia information from the image capturing system 10. As can be seen in FIG. 2B, backend system 200 may be made up of many of the same elements as system 10 performing similar functions as indicated by the same reference numbers. In addition, however, backend end system 200 includes a mass storage database 210. The object indicia captured by image capturing system 10 are passed electronically to the backend system 200 and stored in the mass storage database 210.

The systems 10 and 200 may be embodied as standalone devices, systems, methods, and/or computer program products. Accordingly, some or all of the disclosed subject matter (i.e., the "augmented reality configuration application") may be embodied in hardware and/or in software (including firmware, resident software, microcode, state machines, gate arrays, etc.). Furthermore, the disclosed subject matter of systems 10 and 200 may take the form of a computer program product on a computer-usable or computer-readable storage medium having computer-usable or computer-readable program code embodied in the medium for use by or on conjunction with an instruction execution system. In the context of this document, a computer-usable or computer-readable medium may be any non-transitory medium that can contain, store, communicate, propagate, or transport the program for use by or in connection with the instruction execution system, apparatus, or device. The computer-usable or computer-readable medium may be for example, but not limited to, an electronic, magnet, optical, electromagnetic, infrared, or semiconductor system, apparatus, device or propagation medium. By way of example, and not limitation, computer-readable media may comprise computer storage media and communication media.

Computer storage media used in systems 10 and 200 includes volatile and nonvolatile, removable and non-removable media implemented in any method or technology for storage of information such as computer-readable instructions, data structures, program modules, or other data. Computer storage media includes, but is not limited to, Random Access Memory (RAM), Read-Only Memory (ROM), Electrically Erasable Programmable Read-Only Memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

Figure 3A:
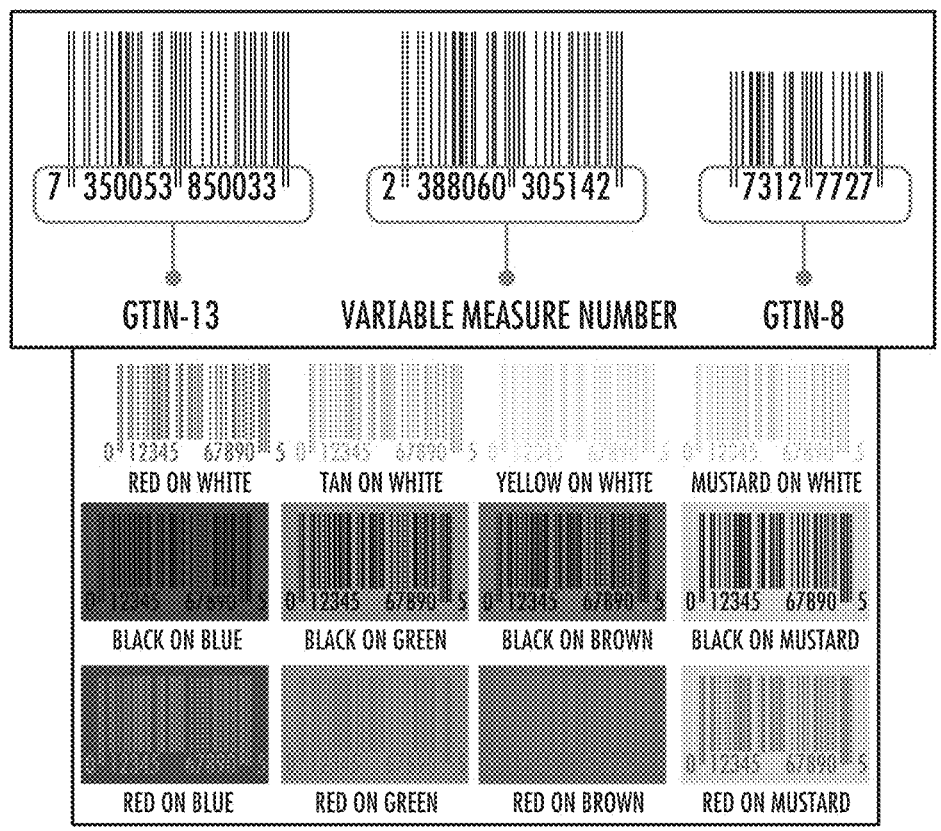
FIGS. 3A-3B illustrate examples of different types of indicia that may be identified by image capturing system 10.
Figure 3B:

Nowadays most objects such as packages are printed on and/or labeled with multiple indicia including barcodes. As shown in FIGS. 3A and 3B, barcodes may differ in types of symbologies, sizes, orientation, printed label color, and/or printed barcode color. Objects with multiple barcodes positioned closely together can be challenging to scan. To read all the barcodes required in a system even those barcodes that are of a different type of symbology, an operator should configure a scanner using a scanner configuration application such as the augmented reality configuration process as described in this disclosure.

The image capturing system 10 (e.g., scanner) of FIG. 1A may be configurable via the augmented reality configuration process (e.g., an application). Augmentation may be achieved by providing contextual configuration information on a video (e.g., in real time) of the barcode of the items intended to be read by the image capturing system 10. The display device 70 of image capturing system 10 shows video of the barcode(s) being scanned. As shown in FIG. 2A, in some embodiments the configured image capturing system 10 may be attached by wire or wireless to a backend personal computer (PC) 200 and the PC may be used to show video of the barcode(s) being scanned. Alternatively, instead of using a dedicated image capturing system 10 as discussed above the process of this disclosure may be implemented using a mobile device such as a cellphone with an in-built imager or camera to capture the video of the object (e.g., package).

The process described herein will utilize the augmented reality configuration application in image capturing system 10 to detect and mark a plurality of barcodes in the field of view of the indicia reader 80 and display the details to the operator on display device 70. The application will guide the operator through text and/or voice to configure the image capturing system 10 to read the intended indicia. For reading multiple indicia such as barcodes on an object, the application will provide various barcode sequencing configurations support. The application may suggest sequencing criteria based on past configuration options. In at least one embodiment, the sequencing criteria might be a predicted sequence for decoding the plurality of indicia wherein the predicted sequence is based on past historical selections (by the operator or other operators) and the display device 70 further includes an indicator such as an "okay" button to receive an authorization input from the operator if the predicted sequence is acceptable (and an indicator to indicate a decline if the predicted sequence is not acceptable). The application will also allow cloning of the setting to other devices via a wired or wireless communication.

Figure 4:
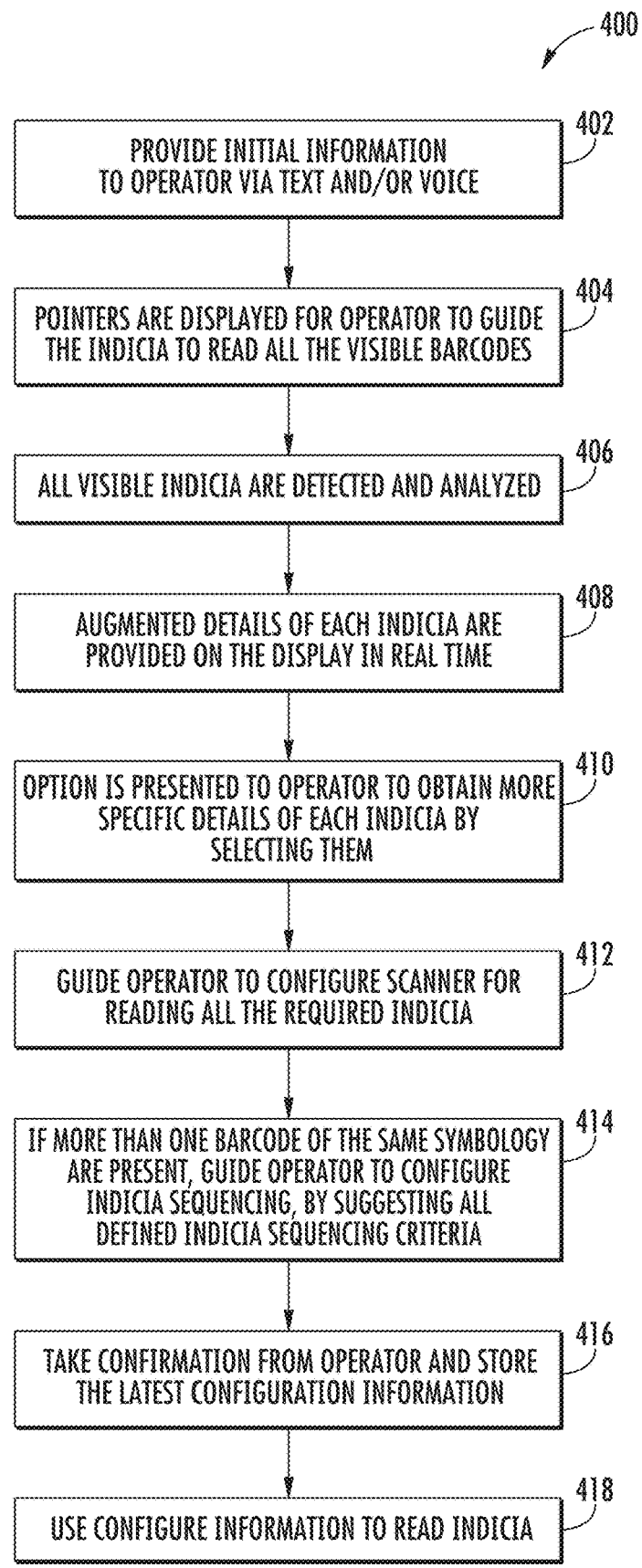
FIG. 4 shows a block diagram of image capturing steps of the method disclosed herein.

FIG. 4 illustrates a flowchart 400 outlining a method and system for configuring the image capturing system 10. The process described below may be voice or text guided by the operator through I/O device 75 of image capturing system 10 so that the interactions do not require any or a limited amount of training. In step 402, initial information is provided to an operator via text or voice. Initial information may include the following (but is not limited to): instructions, a summary of the configuration process, a method for placing the object in view of the indicia reader 80, etc. In step 404, a plurality of pointers are displayed live through the display device 70 for the operator to guide the image capturing system 10. In step 406, the plurality of visible indicia such as barcodes are detected, analyzed, and marked. An example of marking would be to show a highlight around the barcode on the display 70. A sample image is shown captured by image capturing system 10 in FIGS. 5A-5C which illustrates a plurality of visible indicia (e.g., barcodes) highlighted. (FIGS. 5A-5D and a sequencing process are discussed in detail below). The barcodes are either printed directly on the object (e.g., a package) or placed on the object in the form of a label.

In step 408, augmented details of each indicia are provided on the display device 70 in real time. Augmented details may include extra details of the barcode on top of the actual barcode and may be provided through text and/or through voice. An augmented reality configuration process allows using an actual object (such as a package) or its picture for quick configuration of the image capturing system 10. The operator can use the augmented reality configuration process described herein to configure the image capturing system 10 using the actual objects and change the configuration as and when needed. This will enable the operator to configure the image capturing system 10 to read a new item with the indicia without the need of knowing or remembering a detailed configuration process and without understanding the details of the symbologies. In step 410, an option is presented to the operator by prompts such as voice or text to obtain more specific details of each indicia by selecting them. If a selection is made, the application displays more for that particular barcode symbology setting in the scanner such as its maximum or minimum length, etc. In step 412, if more than one type of symbology is present, the operator is guided to configure the image capturing system 10 for reading all the required indicia.

In step 414, for reading a plurality of different types of indicia such as barcodes the application will provide various barcode sequencing configurations support. Barcode sequencing means reading the barcode by the image capturing system 10 in that particular order which saves time by reading all barcodes at once and sending them to the augmented reality configuration application in the defined sequence for further processing. The application may suggest to the operator a sequencing criteria based on past configuration data stored locally (e.g., in memory 30 of image capturing apparatus 10) or in a remote server (e.g., non-volatile memory 30 of backend system 200). Based on the past history the application will send a prompt message to the operator with an option of selecting an old sequence for reading the barcodes. Barcodes sequencing order can be selected based on some or all of the following criteria (but not limited to this list): content, symbology, color (label or barcode), barcode lengths for same symbology, relative barcode sizes for same symbology, relative barcode orientation for same symbology, and any mixed parameters based on any of the above criteria. Sequencing based on a plurality of parameters allows the system 10 to read all the required barcodes at once.

Figure 5A:
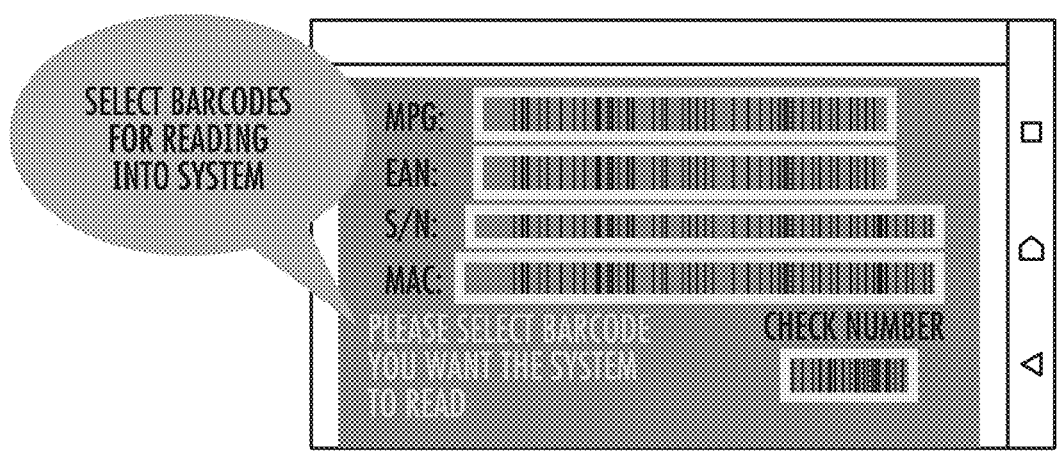
FIGS. 5A-5D shows an example of barcode sequencing.
Figure 5B:
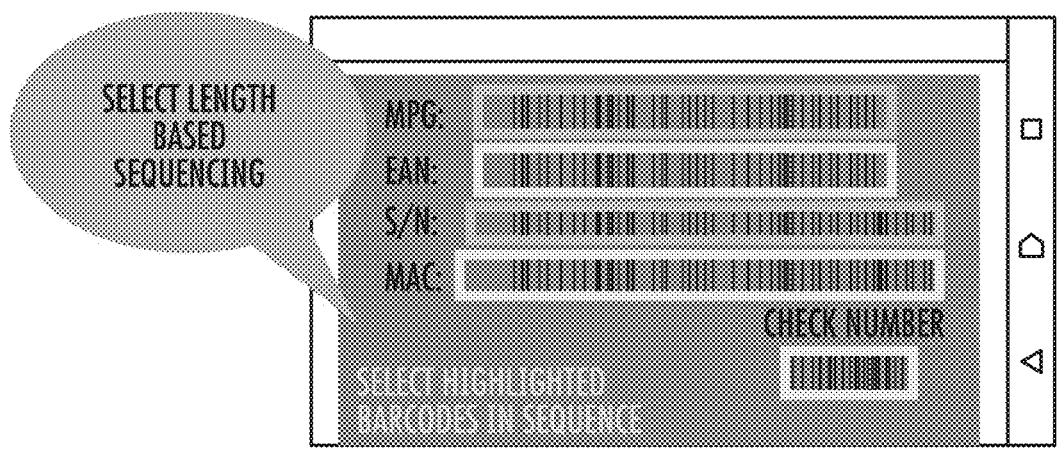
Figure 5C:
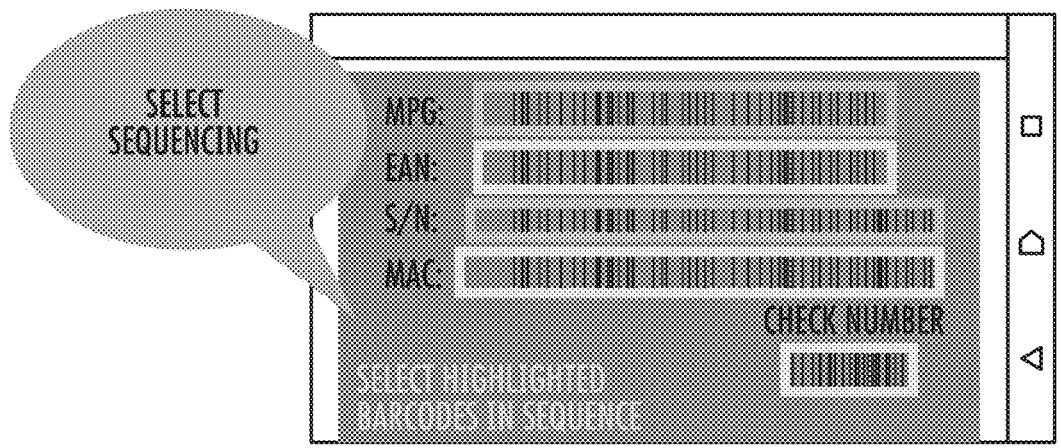
Figure 5D:

FIGS. 5A-5D illustrate barcode sequencing as well as prompts for various actions (in the drawings as bubbles). FIG. 5A prompts an operator to select one or multiple barcodes to be read by reader 80 of the image capturing system 10. FIG. 5B asks user to select barcode length based sequencing. FIG. 5C asks user to select symbology based sequencing. The operator is guided to configure barcode sequencing by supporting all earlier mentioned sequencing criteria. The image capturing system 10 will look to the past for configuration data since it helps for the application to suggest to the operator earlier used sequencing configuration options. The process described herein therefore allows intelligent configuration to take place in that the application detects if more than one indicia such as a barcode of the same symbology is present. The application can also verify the barcodes in an existing system and alert the operator for unregistered barcodes. FIG. 5D is an alert message for a new type of (or unregistered) barcode detected which was never configured in the image capturing system 10 for reading. Further, if someone configures the scanner to read a symbology which is not registered already in the customer system and stored in memory (30, 40, 210), the application will alert the operator to avoid adding unwanted symbology types.

In step 416, configuration confirmation is taken from the operator and the latest configuration information is stored locally (e.g., memory 30 of the image capturing system 10) or in a remote server (e.g., backend system 200) as well. In step 418, configuration information will be used by the application to read a selected indicia. Using this application allows any operator to configure the image capturing system 10 using actual objects such as packages and change the configuration as and when needed, without having detailed knowledge of the configuration process and/or symbology.

Benefits of this process disclosed herein may include the following. First, the application will allow cloning of the setting to other image capturing systems via wired or wireless communication. Second, easy barcode sequencing based on multiple parameters allows the operator to read all the required barcodes at once. Third, intelligent configuration will allow the application to detect if more than one of the same symbology barcodes are used and suggest to the operator sequencing criteria based on past configuration data stored in locally or on a remote server. Fourth, the image capturing system 10 can be configured using actual products with barcodes on them or its pictures having barcode in them through augmented configuration and also through voice or text guided interaction.

To supplement the present disclosure, this application incorporates entirely by reference the following commonly assigned patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;

U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;

U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTI-PURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

The invention claimed is:

1. A method of operating an image capturing system comprising:
   provide an augmented detail associated with each indicium of a plurality of indicia on a display of the image capturing system;
   determine that an indicium of the plurality of indicia has a first symbology different than a second symbology associated with another indicium of the plurality of indicia;
   in response to determining that the indicium differs in symbology, provide, based on the augmented detail, a guide to enable configuration of the image capturing system for reading the indicium;
   present on the display, based on the configuration, a sequencing criterium for reading the plurality of indicia; and
   analyze the plurality of indicia based on the sequencing criterium.

2. The method of claim 1, wherein the sequencing criterium is a predicted sequence for decoding the plurality of indicia, wherein the predicted sequence is based on historical selections by an operator of the image capturing system, and the method further includes displaying an indicator to receive an authorization input from the operator if the predicted sequence is acceptable.

3. The method of claim 1, wherein the plurality of indicia is captured on the display in real time.

4. The method of claim 1, wherein at least one of the plurality of indicia comprises one of a barcode, Quick Response (QR) code, matrix codes, one-dimensional (1D) codes, two-dimensional (2D) codes, and Radio Frequency Identification (RFID) tags.

5. The method of claim 1, further comprising providing the guide to configure the image capturing system using a voice input.

6. The method of claim 1, wherein the augmentation detail includes contextual data pertaining to each of the plurality of indicia.

7. The method of claim 6, wherein the contextual data is presented on the display as a video of an indicium of the plurality of indicia that is being currently scanned.

8. The method of claim 1, wherein the sequencing criterium is based on at least one of content, symbology, color, indicium lengths for same symbology, relative indicium sizes for same symbology, and relative indicium orientation for same symbology.

9. The method of claim 1, the method further comprising displaying an option to obtain additional information for one or more of the plurality of indicia on the display.

10. A system comprising:
    an image capturing device;
    a processor; and
    a memory device coupled to the processor and having a program stored thereon for execution by the processor to:
    provide an augmented detail associated with each of the plurality of indicia;
    determine that an indicium of the plurality of indicia has a first symbology different than a second symbology associated with another indicium of the plurality of indicia;
    in response to determining that the indicium differs in symbology, provide, based on the augmented details, a guide to enable configuration of the image capturing device for reading the indicium;
    present on the display, based on the configuration, sequencing criterium for reading the plurality of indicia; and
    analyze the plurality of indicia based on the sequencing criterium.

11. The system of claim 10, wherein the sequencing criterium is a predicted sequence for decoding the plurality of indicia, wherein the predicted sequence is based on historical selections by an operator, and wherein the program is further executed by the processor to display an indicator to receive an authorization input from the operator if the predicted sequence is acceptable.

12. The system of claim 10, wherein the plurality of indicia is captured on the display of the image capturing device in real time.

13. The system of claim 10, wherein at least one of the plurality of indicia comprises one of a barcode, Quick Response (QR) code, matrix codes, one-dimensional (1D) codes, two-dimensional (2D) codes, and Radio Frequency Identification (RFID) tags.

14. The system of claim 10, wherein the program is further executed by the processor to provide the guide to configure the image capturing device using a voice input.

15. The system of claim 10, wherein the augmentation detail includes contextual data pertaining to each of the plurality of indicia.

16. The system of claim 10, wherein the contextual data is presented on the display as a video of an indicium of the plurality of indicia that is being currently scanned.

17. The system of claim 10, wherein the sequencing criterium is based on at least one of content, symbology, color, indicium lengths for same symbology, relative indicium sizes for same symbology, and relative indicium orientation for same symbology.

18. The system of claim 10, wherein the program is further executed by the processor to display an option to obtain additional information for one or more of the plurality of indicia on the display of the image capturing device.

* * * * *